United States Patent Office.

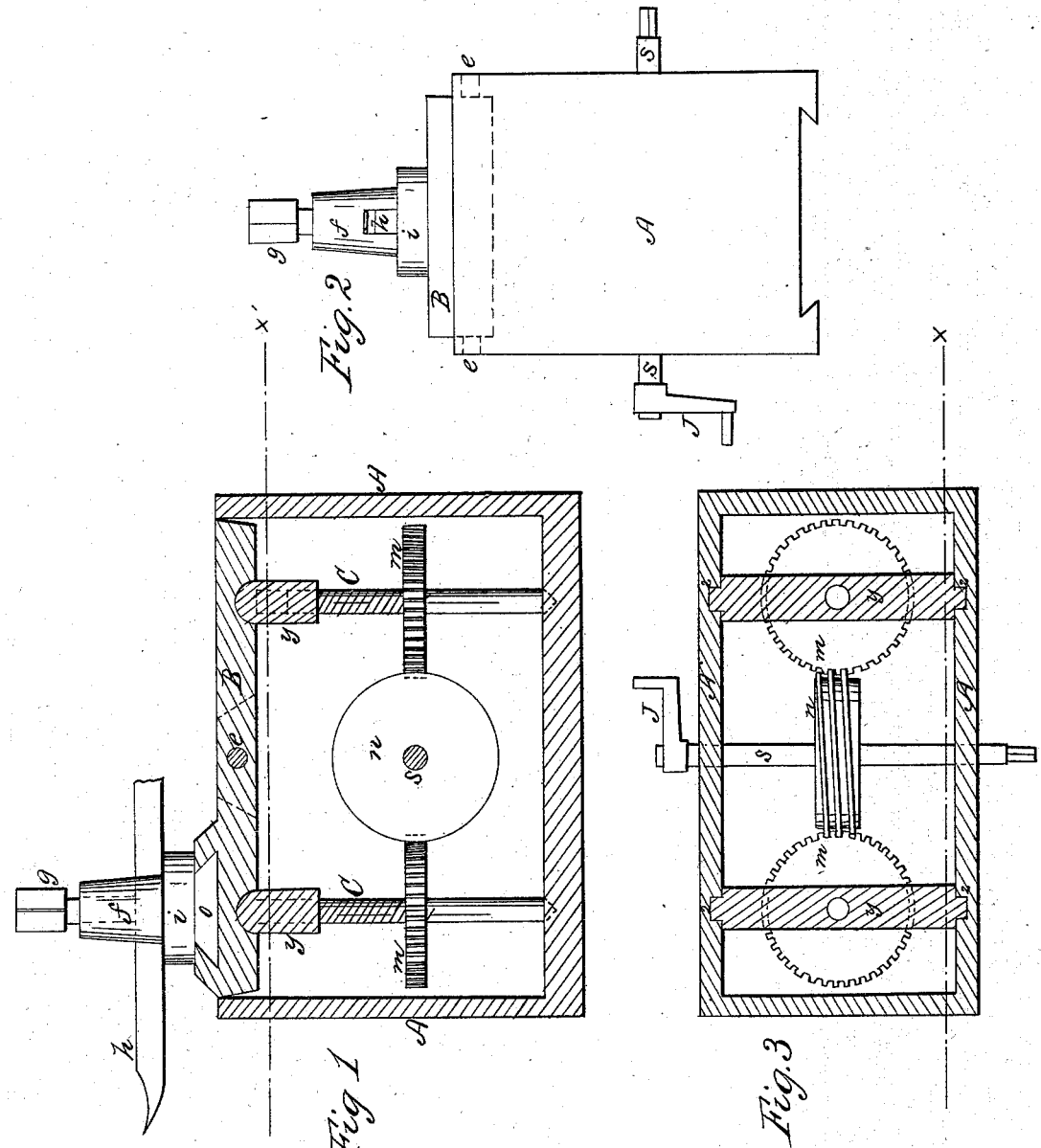

SAMUEL GISSINGER, OF LAWRENCEVILLE, PENNSYLVANIA.

Letters Patent No. 68,870, dated September 17, 1867.

IMPROVED TOOL-HOLDER FOR TURNING-LATHES.

*The Schedule referred to in these Letters Patent and making part of the same.*

TO ALL WHOM IT MAY CONCERN:

Be it known that I, SAMUEL GISSINGER, of Lawrenceville, in the county of Allegheny, and State of Pennsylvania, have invented a new and useful Improvement in Tool-Holder for Turning-Lathes; and I do hereby declare that the following is a full and exact description thereof, reference being had to the accompanying drawing, and to the letters of reference marked thereon.

The nature of my invention consists in an arrangement of an endless screw, wheels, screws, and nuts, combined with a pivoted leaf, which supports the turning-tool, the whole being constructed, arranged, and operating in the manner hereinafter described.

To enable others skilled in the art to make and use my invention, I will proceed to describe its construction and operation. In the accompanying drawing—

Figure 1 represents a longitudinal section of my improved tool-holder cut through at line $x$ of fig. 3.

Figure 2 represents an end elevation of the same.

Figure 3 represents a transverse section of the same cut through a line, $x'$, of fig. 1.

The box A is made in the form represented in the drawing, and is secured to the "slide-rest" of the lathe. The leaf B, which supports the turning-tool, is pivoted at the point marked $e$, as shown in figs. 1 and 2. The socket $f$, for the turning-tool $h$, is held in a dove-tail groove in the leaf B by the part marked $o$, and by the set-screw $g$ forcing the tool $h$ down on the washer $i$. The endless screw $n$ is placed on the shaft $s$, and gears into the wheels $m$ on the screws $c$, which have their lower bearings in the bottom of the box A, and their upper ends work in the long screw-nuts $y$, the top sides of which are made round and fitted in recesses in the under side of the leaf B, and move in grooves, Q, made in the sides of the box A.

As the skilful mechanic will readily understand the construction and arrangement of my improved tool-holder by reference to the accompanying drawing, without further description, I will at once proceed to describe its operation, which is as follows: By turning the crank J the endless screw $n$ will be revolved, and the revolving of it will revolve the wheels $m$, which will force up one of the nuts $y$ and draw down the other. Thus by turning the crank J in one direction the turning-tool is raised, and by turning the crank in another direction it is lowered.

Having thus described the nature, construction, and operation of my improvement, what I claim as of my invention, is—

The pivoted leaf B, when used in combination with the nuts $y$, screws $c$, armed with wheels $m$, said wheels, screws, and nuts being operated through the medium of the endless screw $n$, the whole being arranged, combined, and operating substantially in the manner and for the purpose herein described and set forth.

SAMUEL GISSINGER.

Witnesses:
JAMES J. JOHNSTON,
GEO. H. THOMAS.